United States Patent
Blase

(10) Patent No.: US 6,427,980 B2
(45) Date of Patent: Aug. 6, 2002

(54) CABLE GUIDE

(75) Inventor: Günter Blase, Bergisch Gladbach (DE)

(73) Assignee: Igus Spritzgussteile für die Industrie GmbH, Köln (DE)

(*) Notice: Subject to any disclaimer, the term of this patent is extended or adjusted under 35 U.S.C. 154(b) by 0 days.

(21) Appl. No.: 09/894,217

(22) Filed: Jun. 28, 2001

(30) Foreign Application Priority Data

Jun. 30, 2000 (DE) .......................... 100 30 985

(51) Int. Cl.$^7$ .............................. B63B 35/03
(52) U.S. Cl. ................ 254/134.3 FT; 254/134.3; 15/104.3
(58) Field of Search ............... 254/134.3 FT, 254/134.3 R, 134.7; 15/104.33, 104.3; 24/115 R; 294/19.1; 405/154.1; 226/120; 29/241

(56) References Cited

U.S. PATENT DOCUMENTS

| | | | |
|---|---|---|---|
| 801,759 A | * 10/1905 | Woolldridge | 254/134.3 |
| 1,963,561 A | * 6/1934 | Sanger | 15/104.3 |
| 4,552,338 A | * 11/1985 | Lindgren | 254/134.3 FT |
| 4,771,500 A | * 9/1988 | Kovacs | 15/104.33 |
| 5,386,741 A | * 2/1995 | Rennex | 74/490.05 |
| 5,463,187 A | * 10/1995 | Battle | 174/88 |

FOREIGN PATENT DOCUMENTS

| | | | | |
|---|---|---|---|---|
| AU | 230273 | * | 6/1959 | ......... 254/134.3 FT |
| DE | 198 60 948 A1 | | 7/2000 | |
| EP | 0 789 167 A1 | | 8/1997 | |
| WO | WO 00/41284 A1 | | 7/2000 | |

* cited by examiner

Primary Examiner—Joseph J. Hail, III
Assistant Examiner—Daniel Shanley
(74) Attorney, Agent, or Firm—Akin, Gump, Strauss, Hauer & Feld, L.L.P.

(57) ABSTRACT

A cable guide is provided for guiding lines or cables in a guide channel, the guide preferably having a continuous, elongated slide strip, which can be disposed in a curved orientation to form opposite upper and lower strands and a deflection zone between them. The cable guide has a plurality of guide links that can pivot relative to one another and are preferably arranged on the side of the slide strip facing away from the opposite strand and mounted on the slide strip in detachable fashion. In order to improve a generic cable guide such that it has a longer service life and less noise emission, elements are provided, in addition to any existing slide strip, that absorb the tensile forces acting in the longitudinal direction of the cable guide when it is in essentially extended position. The tensile force-absorbing elements are preferably designed as positive locking elements, e.g., in the form of projections protruding into the pivoting plane and corresponding recesses arranged on adjacent guide links.

20 Claims, 3 Drawing Sheets

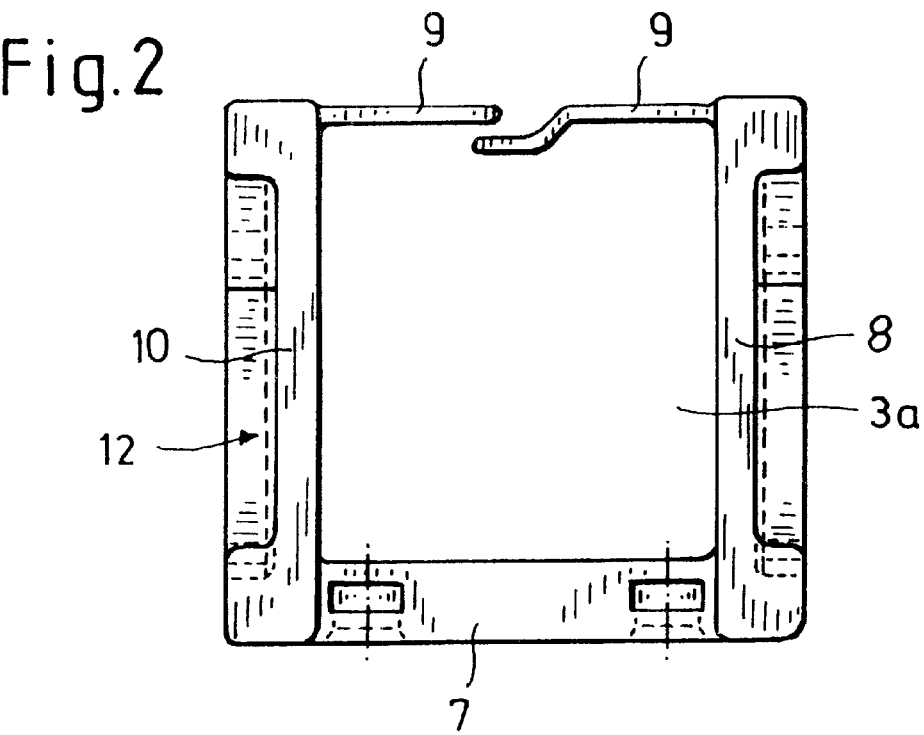
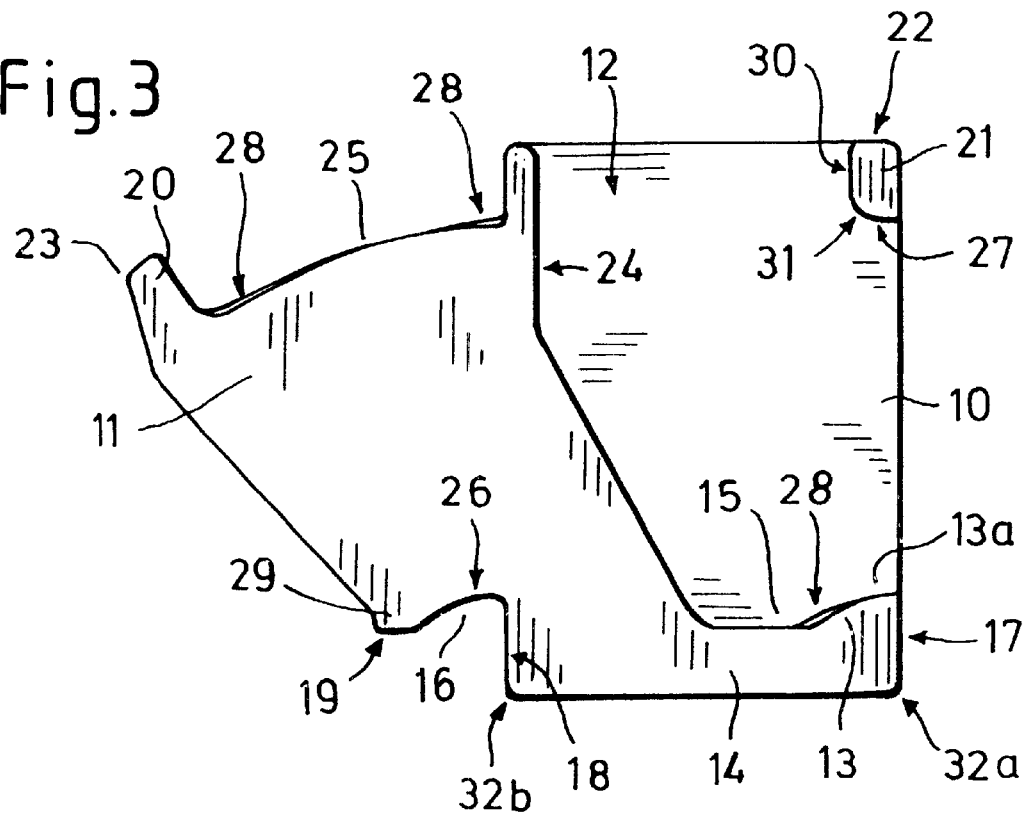

CABLE GUIDE

BACKGROUND OF THE INVENTION

The invention relates to a cable guide for guiding lines or cables in a guide channel with multiple guide links, adjacent guide links being pivotable relative to one another around a pivoting axis, the guide links having side parts to limit the movement of the guided line transverse to the cable guide, wherein the cable guide is disposable into a curved orientation, forming a lower (deflected) strand, a deflection zone and an upper (undeflected) strand directed above the lower strand, and wherein the pivoting axis of the guide links is located in the lower region of the guide links facing the opposite strand when the cable guide is disposed in curved orientation.

In cable guides of this kind, one end can be connected to a stationary unit and the other end to a reciprocating unit, thus making them a suitable alternative to energy guiding chains, whose links pivot about pin connections located at mid-height.

In known cable guides, the tensile forces required for travel motion are transmitted to the guide links by the slide strip or guide strip. In this context, the strip connecting the guide links can serve to guide the lower strand on the upper strand, or the guide links can also be guided on one another. In any case, rapid travel motion of the cable guide exerts considerable tensile forces on the slide strip, which also must have appropriate inherent elasticity in order to enable the pivoting of adjacent guide links relative to one another. In this context, the stresses on the slide strip can be so great under certain circumstances that the slide strip is fatigued by the tension and bending forces acting on it, this potentially leading to impaired functioning of the cable guide or even to rupturing of the slide strip. Furthermore, the longitudinal elasticity of the slide or guide strip leads to a slight axial space between the guide links, thus resulting in corresponding noise generation when the strain on the strip is relieved.

BRIEF SUMMARY OF THE INVENTION

Consequently, an object of the invention is to improve a generic cable guide such that it has a longer service life and lower noise emission.

According to the invention, this object is solved by providing elements that absorb the tensile forces acting in the longitudinal direction of the cable guide when it is in essentially extended position. The tensile force-absorbing elements are preferably arranged in pairs on adjacent guide links and act between them. If necessary, groups of guide links can also be combined. The tensile force-absorbing elements are preferably designed such that they absorb most or virtually all of the exerted tensile forces.

The cable guide preferably has a guide or slide strip, which connects a number of guide links and on which the links are mounted in detachable or permanent fashion. Each of the tensile force-absorbing elements then preferably acts directly between the guide links and represents tensile force-absorbing elements in addition to the slide strip, so that the slide strip is relieved by these elements when tensile forces are applied. For example, the tensile forces can essentially be absorbed by the guide or slide strip, so that only tensile forces exceeding a specific amount are absorbed by the additional tensile force-absorbing elements. The additional tensile force-absorbing elements can also be designed such that the slide strip essentially only serves to align and hold together adjacent guide links in the essentially unstressed state of the slide strip and, for example, is designed as a kind of film. Under certain circumstances, the slide or guide strip can also be completely dispensed with by providing corresponding mounts or appropriately designing the tensile force-absorbing elements.

The tensile force-absorbing elements can be designed as non-positive locking elements, also called force locking elements, although they are preferably designed as positive locking elements (also called form-locking elements) as a result of which they can absorb particularly high tensile forces while enabling simple assembly of the cable guide. The tensile force-absorbing elements may be designed as snap elements. Furthermore, the positive locking elements, in particular, can be designed as essentially rigid areas or components, which can, if necessary, be resistant to both tension and bending and made of the same material as the guide links themselves, without being restricted to this. The tensile force-absorbing elements are preferably designed such that the guide links can be connected to one another in the longitudinal direction of the cable guide virtually without play or with only the degree of play required for low-friction motion. The positive locking elements can be integrally molded on the guide links, where a tensile force-absorbing connection is created between the respective guide links when the positive locking connection is made.

The positive locking elements are preferably designed such that the positive connection is not effective in at least one direction perpendicular to the pivoting axis and can thus easily be undone, e.g., in the form of undercuts and projections engaging them that can, for example, be guided into the undercuts in a direction in the pivoting plane. As a result, the receiving areas for the positive locking elements are open on at least one side in the pivoting plane, particularly in the direction towards the underside of the guide links, and the positive locking elements can be engaged or disengaged in the recess in this direction.

The guide links are advantageously manufactured as a single piece together with the tensile force-absorbing elements, or the tensile force-absorbing elements are integrally molded on the side parts of a guide link or the base plates connecting opposite sides parts of a guide link to one another.

The tensile force-absorbing elements are advantageously arranged on the side parts of the guide links. Alternatively or additionally, they can also be provided on another area of the guide links, such as on the base parts connecting the side parts to one another, where the base parts are adjacent to the pivoting axes and serve to mount the guide links on the slide strip. For this purpose, the positive locking elements can be essentially located in the plane of the base plates, for example, and designed as hook or claw-shaped projections that can engage behind one another extending towards the adjacent base plate. One of the tensile force-absorbing, interacting positive locking elements is preferably arranged on an area of a guide link that laterally overlaps an area of an adjacent guide link.

The tensile force-absorbing elements are preferably located in the lower region of the guide links, i.e., spaced from the middle of the guide links in the "lower" half of the guide links, i.e., in the half of the respective guide link nearest the respective pivoting axis, advantageously in a region which is extending from the pivoting axis to a level of the side part at about one quarter of the height of the side part. Especially, the tensile force-absorbing elements can be arranged at the height of the side face of the transverse member which is arranged adjacent the pivoting axis, the side face being directed to the interior of the guide link.

Particularly, the tensile force-absorbing elements can be arranged approximately or exactly at the level of the pivoting axes or a provided slide strip, particularly at the level of its neutral fiber, thus relieving the slide strip very effectively. Tensile force-absorbing elements can also be spaced radially away from the pivoting axis of the guide links.

In the guide according to the invention, the axes for pivoting the guide links relative to one another are preferably arranged below the middle of the guide links, preferably adjacent to or at the level of the undersides, i.e., the sides facing the opposite strand, of the guide links, and preferably at approximately or exactly the level of the front end of the guide links, e.g., on a frontal contact area of the guide links.

The tensile force-absorbing elements according to the invention can be designed such that they essentially only act in the extended position of the cable guide, or continue to act in a subsequent pivoting angle, which is small compared to the overall pivoting angle of adjacent guide links, e.g., up to approximately 5 to 15°, without being restricted to this. The tensile force-absorbing elements can also be designed such that they can absorb forces in the longitudinal direction of the cable guide or in the direction of connection of adjacent guide links even during significant angling or over the entire range of pivoting angles.

In order to enable disassembly of the cable guide, the tensile force-absorbing elements can be designed such that, with adjacent guide links in an angled position relative to one another, particularly the limit pivoting position, pivoting and/or translatory motion of the guide links relative to one another is enabled, which largely disables the effect of the tensile force-absorbing elements as intended. In this way, for example, a residual degree of resistance may have to be overcome to completely disconnect the links, which can serve, for example, as an assembly aid or to prevent disconnection of the links during use without a slide or guide strip, where this resistance can preferably be overcome manually. Preferably, the force-absorbing elements are designed so that this motion is applicable without deformation of any part of the guide links. Under certain circumstances, it may be necessary to further manipulate adjacent guide links relative to one another in order to separate them.

In order to disconnect adjacent guide links in the region of the tensile force-absorbing elements, the guide links can be designed to pivot about an axis parallel to the pivoting axis of the guide links during travel motion of the cable guide. In this context, the pivoting motion may have to be executed in the direction opposite to the pivoting of adjacent guide links during travel motion of the cable guide. However, if the two axes are spaced apart from one another, pivoting angles in the same direction can also be realized.

Alternatively or additionally, the guide links can be designed such that, in order to disconnect the tensile force-absorbing elements of adjacent guide links from one another, the guide links can move in translatory fashion relative to one another in a direction perpendicular to the pivoting axis of the guide links during travel motion of the cable guide. For example, a given pivoting motion for separating adjacent guide links can be executed in one or several translatory sub-steps.

The configuration of these two variations is preferably realized when the guide links can be disassembled in a partially or completely pivoted position, but also realizable independently of this stipulation. For example, a projection can be provided on a laterally overlapping area of adjacent guide links, which must be overcome by shifting one guide link up before it can be removed in the longitudinal direction of the cable guide.

In order to separate adjacent guide links, they can also be designed such that combined translatory and rotary movements are required.

The movements for separating adjacent guide links from one another are preferably executed in the pivoting plane of the guide links or in a plane parallel to it. If necessary, a translatory and/or rotary movement can also be executed in another direction, e.g., in the manner of transverse displacement of adjacent guide links relative to one another, possibly combined with other movements. This is particularly possible when the guide links have no laterally overlapping areas.

The tensile force-absorbing elements can particularly be designed in the form of projections protruding in the pivoting plane, which can be engaged from behind, and corresponding recesses, which define the nibs that engage behind the projections. The projections and corresponding recesses can have limiting surfaces, which act as positive locking elements and essentially have a corresponding, arc segment-shaped contour and are guided at least partially on top of one another, preferably over the entire pivoting angle. As a result of guide elements of this or a similar kind, the guide links can be supported temporarily or permanently during the travel motion of the cable guide, meaning that, over part or all of the pivoting range, particularly also in the respective limit positions, opposite, corresponding areas of the guide links guided on top of one another only have slight or virtually negligible vertical play in the direction of the underside of the guide links and/or in the longitudinal direction of the cable guide. In the case of a very tight positive locking connection, in particular, this avoids local stresses on a provided slide strip, for example, and enables the quiet running of the cable guide and exerts only slight or negligible counteractive frictional forces on the angling motion of the guide links. Apart from a slight tolerance of a few degrees, e.g. 5° or less, the extension of the guide areas preferably corresponds exactly to the pivoting angle.

Independently of the positive locking elements, elements for guiding adjacent guide links during pivoting motion can also be provided, which preferably can have the arc segment-shaped guide surfaces described above, but can also be of another design. These elements are then provided in addition to the guide or slide strip.

In addition to the optionaly provided slide strip, stops are preferably provided that limit mutual vertical displacement of the guide links relative to one another at least over part, but preferably over the entire angling motion of the guide links. An upward and downward vertical movement of the guide links relative to one another beyond a degree of play required for low-friction travel is prevented in this way. This significantly improves the quiet running of the cable guide.

In particular, the corresponding stops can be provided in the form of laterally overlapping areas of the guide links, which can preferably be arranged above the tensile force-absorbing elements, particularly in the upper half of the guide links. For example, any stops that limit the pivoting position can simultaneously act as stops of this kind.

The stops limiting the vertical displacement are preferably arranged such that they act in one or both limit positions of the pivoting motion.

Stops that limit the angling motion of adjacent guide links relative to one another are preferably provided in the upper half, particularly preferably on the upper end of the guide link, i.e., the end facing away from the pivoting axis.

In this context, the tensile force-absorbing elements can be immediately adjacent to, or transition into the stops for limiting the pivoting motion of adjacent guide links.

In addition, adjacent guide links are advantageously provided with at least two corresponding pairs of stops that limit the pivoting motion and act one after the other. The corresponding pairs of stops can be provided in a maximum pivoting direction, particularly to limit the extension of the cable guide, but also to limit the two pivoting motions. One of the at least two corresponding pairs of stops, particularly the pair of stops on adjacent guide links that acts first, can simultaneously be designed as tensile force-absorbing elements or be immediately adjacent to these elements. For example, a limiting surface of a tensile force-absorbing nib that engages behind a projection can have a corresponding stop surface. In general, the stop surfaces are essentially parallel to the pivoting direction when the pair of stops goes into action. If necessary, the stop surfaces can also be angled a few degrees in the direction of the inside of the cable guide, thus preventing the stops from slipping off one another laterally. The pair of stops that absorbs most of the impact forces is preferably at least the second pair of stops to take action, so that the preceding pair of stops cushions the primary impact and thus dampens the noise when the guide links hit one another.

The pair of stops that acts first is preferably adjacent to or at the height of the pivoting axis of the guide links, as these stops are moved at a comparatively low angular velocity and thus bring about greater noise dampening.

Additionally or alternatively to other elements, interacting run-up surfaces can be provided as noise dampers on adjacent guide links, along with areas that run up on these during the pivoting motion of the guide links. In this context, the run-up surfaces enclose only a small angle, e.g., of less than about 10 degrees, preferably about 5 degrees or less, relative to the pivoting direction, so that the run-up area of the adjacent guide link, which contacts the run-up surface at a predefined pivoting angle, becomes vertically offset relative to the run-up surface as the pivoting angle increases. The run-up height can be absorbed by elastic material deformation or by a degree of play provided between adjacent guide links, which leads to the—slight—vertical offset of adjacent guide links relative to one another. The contact point of the run-up area on the run-up surface is preferably positioned immediately in front of the corresponding stop, where the pivoting angle when the run-up area contacts the run-up surface is small compared to the overall pivoting angle of adjacent guide links relative to one another. Overall, this results in the formation of a run-up "brake" that slows the run-up velocity of the corresponding stops for limiting the pivoting angle.

The run-up surface, and/or the area of a guide link that contacts the run-up surface, can each be provided on the side parts of the guide link. Independently of this or in addition, the run-up surfaces or run-up areas can be provided on existing guide areas, possibly also immediately on the tensile force-absorbing elements, or the tensile force-absorbing elements can be provided with corresponding run-up surfaces and run-up areas.

Corresponding run-up surfaces and areas that run up them can be provided for one or preferably both limit positions of the pivoting motion.

Furthermore, laterally protruding and/or receding areas can be provided on the guide links, preferably on the side parts, which limit the vertical displacement of the guide links relative to one another when the run-up areas run up the run-up surfaces, meaning that adjacent guide links get slightly wedged or clamped together if the pivoting motion continues. Due to the forces acting on the cable guide during the intended travel motion, this clamping or wedging of adjacent guide links can be eliminated by completing a pivoting motion.

The side parts of the guide links can engage at least partially around the guide or slide strip on both sides. If necessary, they can also be flush with the top side of the slide strip facing the guide link or extend down beyond the underside of the slide strip. The bottom edges of the side parts preferably end above the bottom edge of the slide strip or are flush with it, so that, when the upper strand of the cable guide lies against the lower strand, the respective top and bottom sides of the slide strip come into contact with one another and function as slide areas during the travel motion of the cable guide. The strip connecting the guide links can also be arranged as a guide strip inside the guide channel formed by the guide links.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 2 is a front end view of a guide link of the cable guide according to the invention;

FIG. 3 is a side view of a guide link according to FIG. 2; and

DETAILED DESCRIPTION OF THE INVENTION

Figure 1:
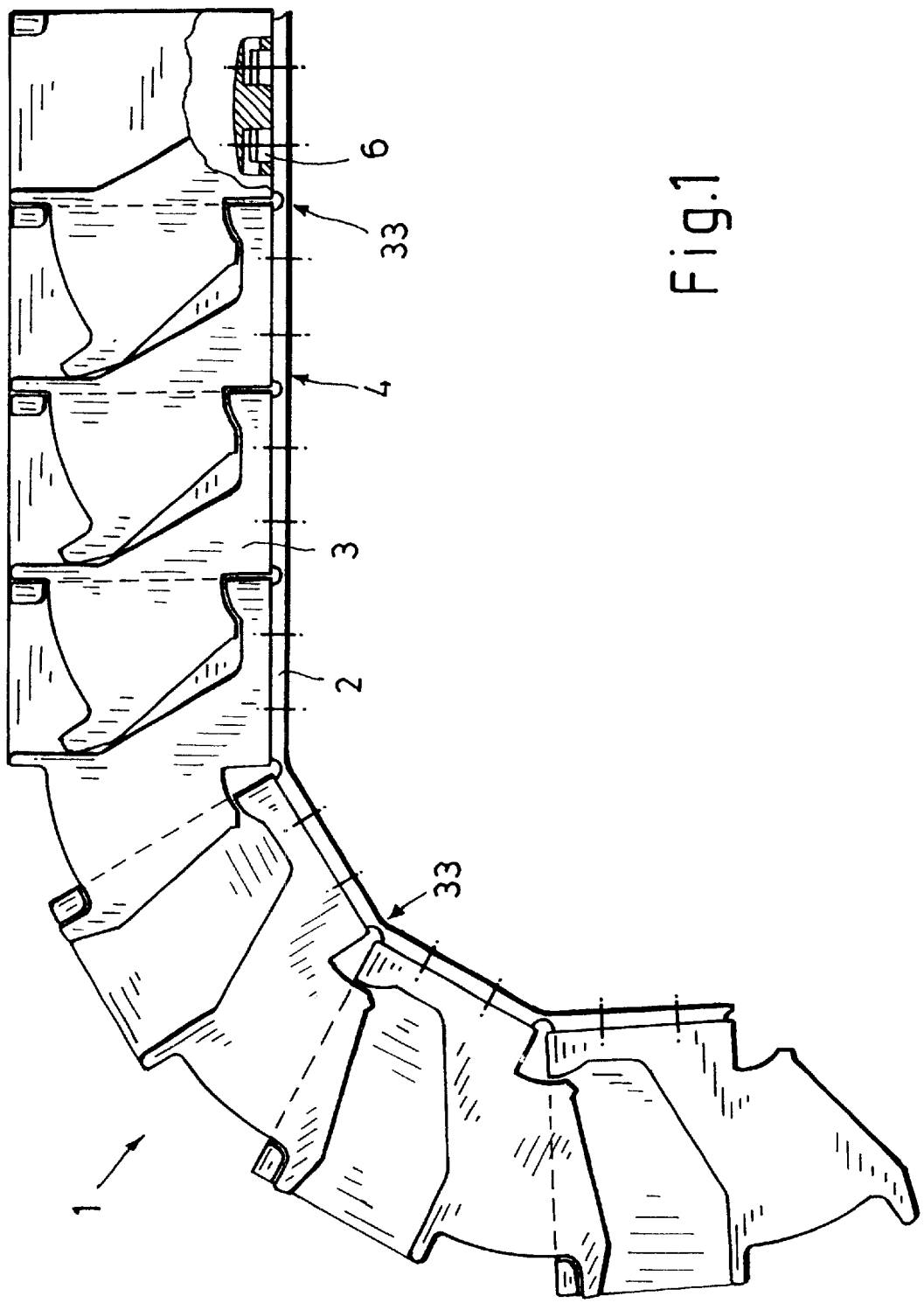
FIG. 1 is a side view partially in section, of a generic cable guide with guide links mounted on a slide strip.

FIG. 1 shows a generic cable guide according to DE 198 60 948, which is identical to the device according to the invention with regard to the features described here. Cable guide 1 shown in FIG. 1 has a flat slide strip 2 with guide links 3 mounted on it that enclose a guide channel 3a (see FIG. 2). In this context, underside 4 of slide strip 2 serves as a slide surface when the upper strand of the cable guide is guided in slide fashion on top of the lower strand. The top side of the slide strip is provided with nib-shaped, positive locking elements 6 for mounting guide links 3.

According to FIG. 2, guide links 3, which can be of single or multi-part design, have a web-like bottom part 7 and side parts 8 mounted on them, which can possibly be integrally molded together. If necessary, bottom parts 7 and side parts 8 can also be designed as separate components. Furthermore, a transverse member 9, which is of two-part design in this embodiment in order to facilitate the arrangement of the lines to be guided in guide channel 3a, is provided on side parts 8 in order to limit guide channel 3a.

With regard to the further design of the cable guide, reference is made to DE 198 60 948 in its entirety, including the disclosures referring to the design of the guide links, the slide strip and the mounting of the guide links on the slide strip.

Figure 4:
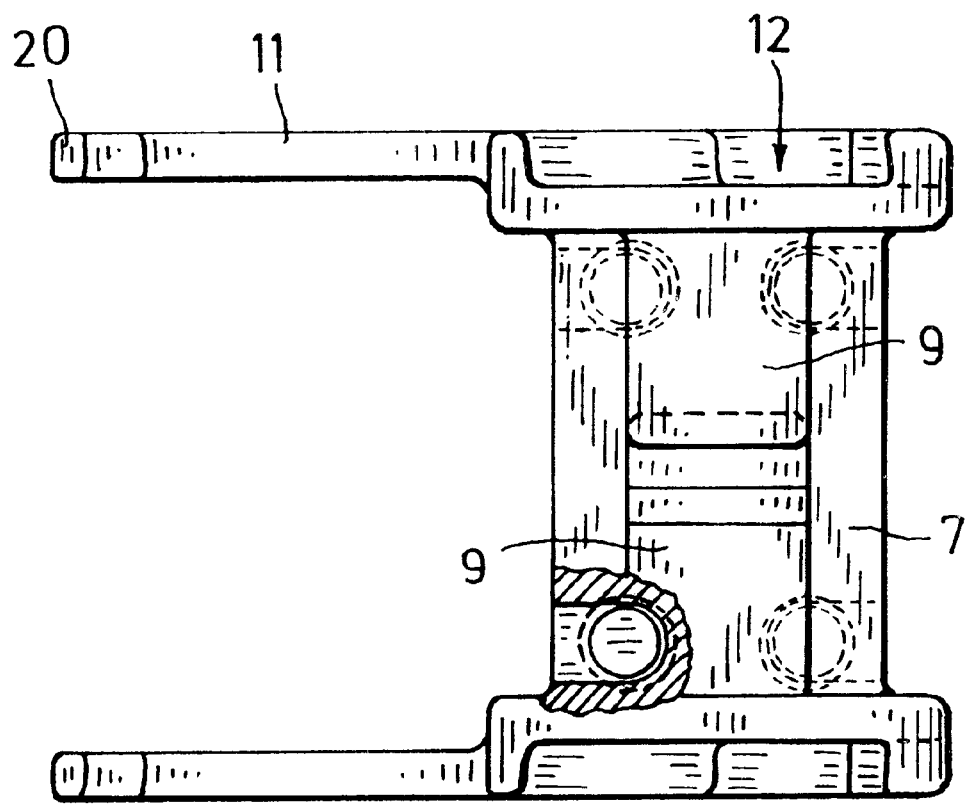
FIG. 4 is a top view of a guide link according to FIG. 2.

The single-part guide link according to FIGS. 2 to 4, which can be designed as a plastic molding and produced by an injection molding process, has side parts 8 with a receding area 10 (relative to the inside of the guide channel) of essentially rectangular shape which, together with bottom part 7, forms an essentially U-shaped guide link. Integrally molded, axially protruding area 11 is approximately in the shape of an arc segment and can be received by recess 12 of receding area 10 of the adjacent guide link mounted in front of it, when the cable guide is assembled. In this context, protruding areas 11 laterally surround receding areas 10.

A laterally protruding, arc segment-shaped projection 13, whose arced surface 13a points upwards, i.e., faces away from the slide strip and extends in the pivoting plane, is integrally molded on the lower region of the side parts, adjacent to the essentially vertical front face of side parts 8. The shorter end of projection 13 transitions into a connecting web 14 with an essentially horizontal top side, which merges into protruding area 11. The center of the arc segment-shaped projection 13 is located at approximately or exactly the level of the neutral fiber of the slide strip or its bottom edge, and approximately or exactly at the level of the front end 17 of side part 8 facing away from protruding area 11. The length of the arc of the projection corresponds to the maximum pivoting angle of the guide links. If it is comparatively small, so that contact with the arc under tensile forces could lead to the overslip of the engaging element of the adjacent link, a steeper contact surface can be provided. Projection 13 transitions into a web 14 with a top side 15, which is essentially horizontal or parallel to the longitudinal direction of the slide strip and can possibly also be inclined relative to the plane of the slide strip.

Projection 13 is received on the adjacent guide link by a correspondingly arc segment-shaped recess 16 of area 11, which overlaps with the first guide link mentioned when the cable guide is assembled. The length of the arc of recess 16 corresponds to that of projection 13, without being restricted to this. The center axis runs essentially perpendicular to the principal plane of the slide strip, although it can also be at an angle to it, if necessary, e.g. when projection 13 also slightly overlaps the adjacent guide link. According to the embodiment, edge 18 of recess 16, which is perpendicular to the plane of the slide trip, is parallel with the front end 17 of the guide link and contacts the edge of projection 13 facing the front end 17 when the cable guide is in the extended position. If necessary, it can also have a slight degree of play relative to it. Like that of projection 13, the center of arc-shaped recess 16 is at the level of the front end 17 and the neutral fiber of the slide strip or its bottom edge.

The radius of recess 16 is only slightly greater than that of projection 13, in order to ensure low-friction and otherwise essentially play-free pivoting motion of the same.

Recess 16 continues on the side into area 19, which is adapted to the contour of top side 15 of web 14 and, together with top side 15, forms a corresponding pair of stops when the cable guide is in rectilinear orientation. For this purpose, top side 15 of the web and area 19 are of planar design and run parallel to the principal plane of slide strip 2 when the cable guide is in extended position, without being restricted to this.

Axially protruding area 11, which engages around the adjacent guide link, is provided on the end facing away from the guide link with a hooked projection 20, which is arranged in such a way that it engages behind a laterally protruding projection 21 arranged on side part 8 of the adjacent guide link. The edges of projection 21 are flush with top edge 22 of side part 8 and the front end 17 associated with projection 13. However, it can also be spaced away from these. The maximum pivoting motion of adjacent guide links in the deflection zone of the guide chain is limited by hooked projection 20 contacting projection 21. In this context, the radial extension of projection 13 and recess 16 is dimensioned such that, when adjacent guide links are at the maximum angled position, partial areas of them still lie opposite one another. Furthermore, the shape of top and bottom edges 25, 26 of area 11, which laterally overlaps the adjacent guide link and is guided between two projections (projections 13 and 21 in this case) during the pivoting motion of the guide links, is dimensioned such that the vertical offset of adjacent guide links relative to one another is restricted through part, or preferably all, of the pivoting motion, preferably to the degree still required for low-friction angling of the guide links.

In order to limit the pivoting angle when the cable guide is extended, another pair of stops is also provided as far away as possible from the center of rotation of the pivoting motion. Together with the pair of stops formed by top side 15 of the web and area 19, two pairs of stops are thus provided that are at significantly different radial distances from the center of rotation of the pivoting motion of the guide links. In this context, the pair of stops that contact at low angular velocity is activated prior to the pair of stops that goes into action at a greater angular velocity, so that the first pair of stops provides for particularly good noise damping. According to the embodiment, another stop at the maximum distance from the rotational axis of the guide links is formed by axially protruding edge 23 of projection 20, which contacts the edge delimiting recess 12 in area 24, which runs essentially perpendicular to the plane of the slide strip in the embodiment. If necessary, a larger area stop can be provided instead of the essentially punctiform stop. Alternatively or additionally, areas of the front ends 17 of the guide links can also be designed as stop surfaces, such as the front end 17 in the region of projections 13 and 21 and the opposite front end 17 of the adjacent guide link.

In order to enable very smooth and quiet travel motion of the cable guide, adjacent guide links can, as an alternative or addition to the double pair of stops, be provided with areas that run onto each other in the last angular segment of the pivoting motion. Such areas of adjacent guide links that run onto each other have facing surfaces with preferably non-arc-shaped contours, which come into contact at a predefined pivoting angle and, as the pivoting motion progresses, cause increasing compression of the guide links under radially acting compression forces. The increasing surface compression of the areas running onto each other can be partially or completely absorbed by plastic deformation of the areas and/or by play permitting a corresponding offset of the guide links or corresponding components relative to one another. As a result, the run-up areas act as "braking" devices located in front of the respective stop. In this context, the maximum surface compression is set such that it can be easily overcome by the forces acting on the cable guide during proper operation, so that the brake does not jam and the guide links can pivot relative to one another during deflection of the cable guide without any further intervention. To this end, the areas on adjacent guide links that run onto each other can be provided in the form of opposing, slightly spaced, arc-shaped surfaces that are arranged concentrically around pivoting axis 33 (FIG. 1) of the guide links, where the run-up surfaces continue on the radially inward arc as an area with a greater radius of curvature, e.g. as tangents, which extend radially beyond the larger arc.

According to the embodiment, run-up surfaces 28 are provided in the form of tangential areas on the end of arc segment-shaped projections 13 facing away from the front end 17, which interact with nib-shaped projection 29, and tangential run-up surfaces on arc segment-shaped top edge 25 of side part 8, which interact with run-up area 27 of projection 21.

In order to assemble the cable guide, a number of guide links can first be preassembled, wherein the tensile force-absorbing elements are particularly effective in an extended or slightly angled arrangement of the guide links, so that a manageable strand of guide links can be constructed that is mounted on the slide or guide strip.

In order to connect two guide links to one another, protruding areas 11 are inserted in recesses 12 of the adjacent guide link, reaching laterally around side part 8. To this end, hooked projection 20 is advantageously brought into contact with inner stop surface 30 of projection 21 of the corresponding guide link by threading projection 20 into recess 12. This is followed by a pivoting motion about bottom edge 31 of projection 21 facing away from the front end 17, which is correspondingly rounded for this purpose, until protruding area 11 swings into recess 12 and opposite bottom edges 32*a*, 32*b* of the adjacent guide links come into contact with one another. This position corresponds to the maximum pivoting position of the guide links during proper operation of the cable guide. Subsequently, the respective pair of guide links can be moved into extended position by pivoting the guide links about the guide defined by projections 13. The play between the arc segment-shaped edge of recess 16 and the arc segment-shaped top side of projection 13, as well as the angular extension of projection 13 and recess 16, are thus dimensioned such that, upon rotary movement about bottom edge 31, projection 29 can be disengaged freely over projection 13, or by overcoming minimal retaining forces, so that the guide links can be disconnected.

Consequently, positive locking elements 13, 16 are designed such that they can be engaged and disengaged as intended by pivoting and/or translatory movement of the guide links within the pivoting plane. In this context, no snap connections of any kind are required, although they can be additionally provided if necessary, particularly if the snap connections can also be engaged and disengaged by moving the guide links in the pivoting plane. In this case, the connection can also be achieved by snap elements that extend along the pivoting plane, so that the engaging movement is executed in the pivoting plane.

FIG. 4 shows a top view of a single-part guide link according to FIG. 2. The top view further illustrates that the stop surfaces of projection 21, which are essentially vertical and face away from the front end 17, slope inwardly at an angle of a few degrees, e.g. approximately 4 degrees, thus preventing the lateral recoil of the stops when they hit one another.

It will be appreciated by those skilled in the art that changes could be made to the embodiments described above without departing from the broad inventive concept thereof It is understood, therefore, that this invention is not limited to the particular embodiments disclosed, but it is intended to cover modifications within the spirit and scope of the present invention as defined by the appended claims.

I claim:

1. A cable guide for guiding lines or cables in a guide channel, comprising a plurality of guide links, wherein a) adjacent guide links are pivotable relative to one another around a pivoting axis, b) the guide links have side parts to limit movement of a guided line transverse to the cable guide, c) the cable guide is disposable in a curved orientation, forming opposite upper and lower strands and a deflection zone between them, d) the pivoting axis, as seen from the upper strand, is located below a bisecting line in a longitudinal direction of the cable guide which divides each guide link into segments of equal distance in a direction transverse to the cable guide when the cable guide is disposed in the curved orientation, e) the guide links have tensile force-absorbing elements that absorb tensile forces acting in the longitudinal direction of the cable guide when the cable guide is in an essentially extended position, f) each guide link has a bottom part, a side part and a transverse member defining the guide channel, and g) adjacent guide links are connected to each other in the longitudinal direction of the cable guide without play.

2. The cable guide according to claim 1, wherein the tensile force-absorbing elements are designed as positive locking elements.

3. The cable guide according to claim 1, wherein the tensile force-absorbing elements are arranged on the side part.

4. The cable guide according to claim 1, wherein the tensile force-absorbing elements are located on the guide links at positions below the bisecting line, as seen from the upper strand when the cable guide is disposed in the curved orientation.

5. The cable guide according to claim 2, wherein adjacent guide links are angularly displaced from one another, such that a function of the positive locking elements can be disabled by at least a pivoting motion of the adjacent guide links.

6. The cable guide according to claim 5, wherein the positive locking elements are designed such that, in order to disconnect adjacent guide links, the adjacent guide links are pivotable about an axis parallel to the pivoting axis of the guide links during a travel motion of the cable guide.

7. The cable guide according to claim 2, wherein, adjacent guide links are angularly displaced from one another, such that a function of the positive locking elements can be disabled by at least a translatory motion of the adjacent guide links.

8. The cable guide according to claim 7, wherein the positive locking elements are designed such that, in order to disconnect adjacent guide links, the adjacent guide links are movable in translatory fashion relative to one another in a direction perpendicular to the pivoting axis of the guide links.

9. The cable guide according to claim 2, wherein the tensile force-absorbing, positive locking elements are provided on adjacent guide links as projections extending parallel to the side parts and protruding into a plane perpendicular to the pivoting axis and into corresponding recesses.

10. The cable guide according to claim 1, wherein elements are provided to guide adjacent guide links on one another over at least a segment of a pivoting angle of the guide links.

11. The cable guide according to claim 10, wherein the tensile force-absorbing elements are arranged where the guide links come into tensile force-absorbing engagement with each other spaced from the pivoting axis.

12. The cable guide according to claim 1, wherein the guides are designed as corresponding arc segment-shaped guide surfaces extending in a plane perpendicular to the pivoting axis, which surfaces are guided on one another over at least a segment of the pivoting angle engaging each other, and wherein the guide surfaces are arranged on the tensile force-absorbing elements.

13. The cable guide according to claim 1, wherein the guide links have stops that limit mutual vertical displacement of the guide links relative to one another over at least part of a pivoting motion of the guide links.

14. The cable guide according to claim 13, wherein the stops are arranged below the bisecting line, as seen from the upper strand when the cable guide is disposed in the curved orientation.

15. The cable guide according to claim 1, wherein at least two corresponding pairs of stops are provided that limit the pivoting motion of adjacent guide links in at least one pivoting direction and come into contact one after another.

16. The cable guide according to claim 15, wherein one of the at least two pairs of stops that comes into contact first during the pivoting motion is adjacent to the pivoting axis of adjacent guide links, and another of the at least two pairs of stops that comes into contact at a later point during the pivoting-motion is at a greater distance from the pivoting axis.

17. The cable guide according to claim 1, wherein run-up surfaces and corresponding areas that contact the run-up surfaces are provided on surfaces of adjacent guide links that move relative to one another and act as braking devices with regard to pivoting motion around the pivoting axis of adjacent guide links.

18. The cable guide according to claim 1, wherein the side parts of adjacent guide links have corresponding projections and recesses that engage one another and are dimensioned such that the adjacent guide links are fixed in a press fit to at least correspond to the maximum pivoting position of the guide links.

19. The cable guide according to claim 1, wherein a guide strip is provided, which connects a plurality of guide links to one another and extends in the longitudinal direction of the cable guide, and on which the guide links are mounted.

20. A cable guide for guiding lines or cables in a guide channel comprising a plurality of guide links, wherein a) adjacent guide links are pivotable relative to one another around a pivoting axis, b) the guide links have side parts to limit movement of a guided line transverse to the cable guide, c) the cable guide is disposable in a curved orientation, forming opposite upper and lower strands and a deflection zone between them, d) the pivoting axis, as seen from the upper strand, is located below a bisecting line in a longitudinal direction of the cable guide which divides each guide link into segments of equal distance in a direction transverse to the cable guide when the cable guide is disposed in the curved orientation, e) the guide links have tensile force-absorbing elements that absorb tensile forces acting in the longitudinal direction of the cable guide when the cable guide is in an essentially extended position, f) each guide link has a bottom part, a side part and a transverse member defining the guide channel, g) adjacent guide links are connected to each other in the longitudinal direction of the cable guide without play and h) the tensile force-absorbing elements are located on the side parts of the guide links and overlap with side parts of adjacent guide links.

* * * * *